(12) United States Patent
Allen et al.

(10) Patent No.: US 9,020,570 B2
(45) Date of Patent: Apr. 28, 2015

(54) PORTABLE ELECTRONIC DEVICE WITH AUXILIARY INPUT DEVICE AND FLEX CONNECTOR THEREFOR

(75) Inventors: Aaron Robert Allen, Pembroke Pines, FL (US); Felipe Alonso Varela, Sunrise, FL (US); Rohit Krishna Koppal, Pompano Beach, FL (US); Shawn Glenfield Bernard, Deerfield Beach, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 536 days.

(21) Appl. No.: 13/019,008

(22) Filed: Feb. 1, 2011

(65) Prior Publication Data
US 2011/0201390 A1 Aug. 18, 2011

Related U.S. Application Data

(60) Provisional application No. 61/304,693, filed on Feb. 15, 2010.

(51) Int. Cl.
*H04M 1/00* (2006.01)
*H04M 1/02* (2006.01)

(52) U.S. Cl.
CPC .......... *H04M 1/0274* (2013.01); *H04M 1/0237* (2013.01)

(58) Field of Classification Search
USPC ................ 455/575.4, 90.3, 575.1; 16/362
See application file for complete search history.

(56) References Cited

U.S. PATENT DOCUMENTS

| 7,734,314 B2 * | 6/2010 | Ryu et al. ....................... 455/566 |
| 7,761,123 B2 * | 7/2010 | Hyun et al. .................. 455/575.1 |
| 7,822,446 B2 * | 10/2010 | Vatanparast et al. ........ 455/575.4 |
| 7,925,317 B2 * | 4/2011 | Lee et al. .................... 455/575.4 |
| 8,108,014 B2 * | 1/2012 | Demuynck ................ 455/575.1 |
| 8,244,317 B2 * | 8/2012 | Knoppert et al. .......... 455/575.1 |
| 2006/0033837 A1 | 2/2006 | Kwon |
| 2006/0109256 A1 * | 5/2006 | Grant et al. .................... 345/173 |
| 2008/0119248 A1 * | 5/2008 | Nissen et al. ............... 455/575.4 |
| 2008/0146298 A1 * | 6/2008 | Kwak ......................... 455/575.4 |
| 2009/0170574 A1 * | 7/2009 | Harmon et al. ............ 455/575.4 |
| 2009/0195499 A1 | 8/2009 | Griffin |
| 2009/0229081 A1 * | 9/2009 | Demuynck ..................... 16/362 |

(Continued)

FOREIGN PATENT DOCUMENTS

WO 2009113124 A1 9/2009

OTHER PUBLICATIONS

Extended European search reported issued Apr. 20, 2011 in respect of corresponding European Patent Application No. 11152957.4.
Response to Extended European Search Report, European Patent Application Serial No. 11152957.4, filed Jun. 13, 2011.
Examiner's Report for Canadian Patent Application U.S. Appl. No. 2,731,087 mailed Mar. 12, 2013.

(Continued)

*Primary Examiner* — Amancio Gonzalez
(74) *Attorney, Agent, or Firm* — Fish & Richardson P.C.

(57) ABSTRACT

A portable electronic device includes a lower housing and an upper housing slidable relative to the lower housing between closed and open positions. The upper housing includes an auxiliary input device and a display. A primary flex connector electrically connects the lower and upper housings. At least one secondary flex connector may electrically connect the primary flex connector to the auxiliary input device or the display. The upper housing may include a cover plate that is removable to allow access to at least a portion of the flex connectors.

17 Claims, 15 Drawing Sheets

(56) References Cited

U.S. PATENT DOCUMENTS

2010/0041451 A1* 2/2010 Washiyama ............... 455/575.4
2010/0151909 A1* 6/2010 Zhou ........................... 455/563
2010/0331060 A1* 12/2010 Yoshida ..................... 455/575.1

OTHER PUBLICATIONS

Decision to Grant a European patent pursuant to Article 97(1) EPC mailed Jun. 28, 2012, in corresponding European application No. 11152957.4.

* cited by examiner

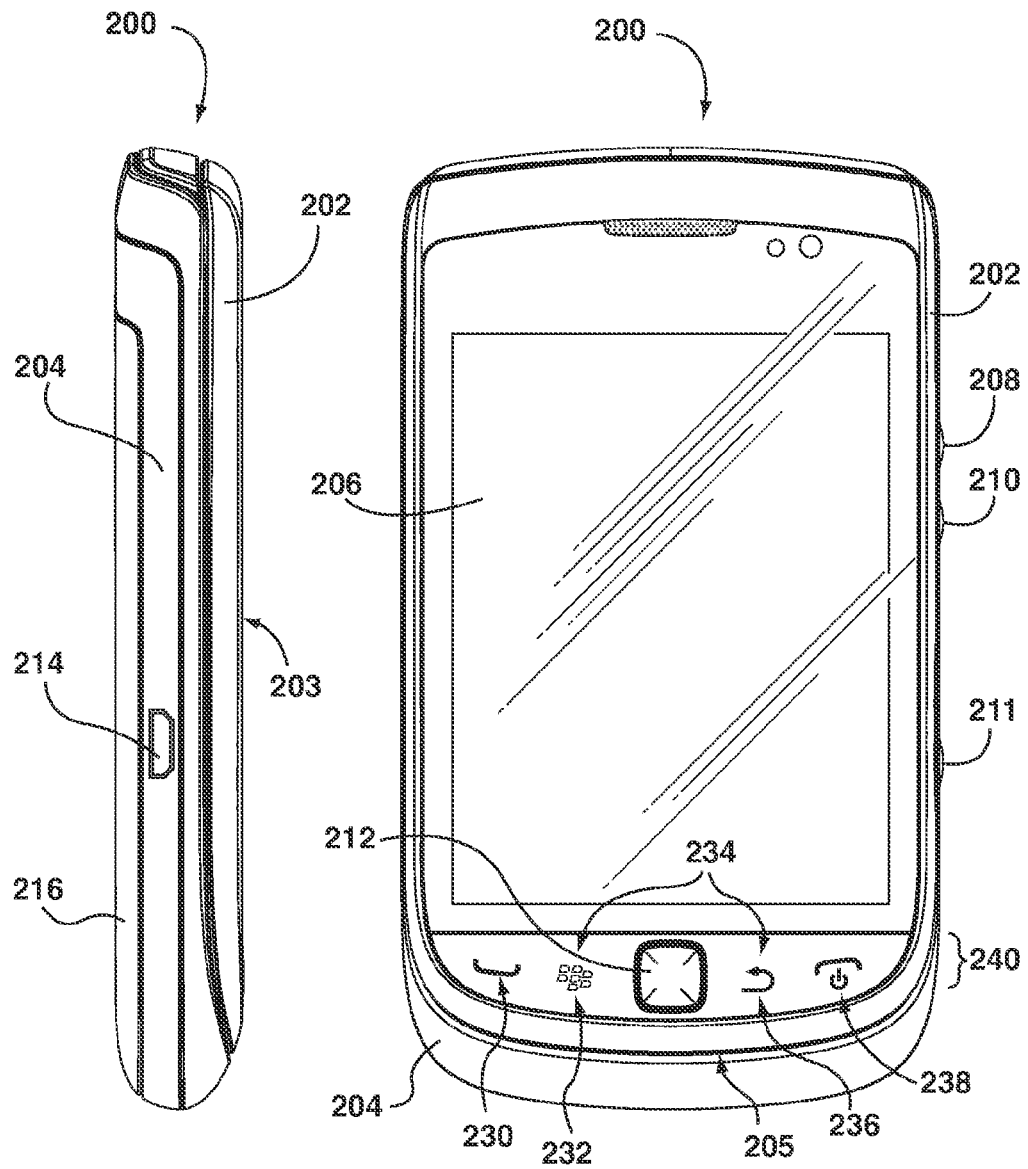

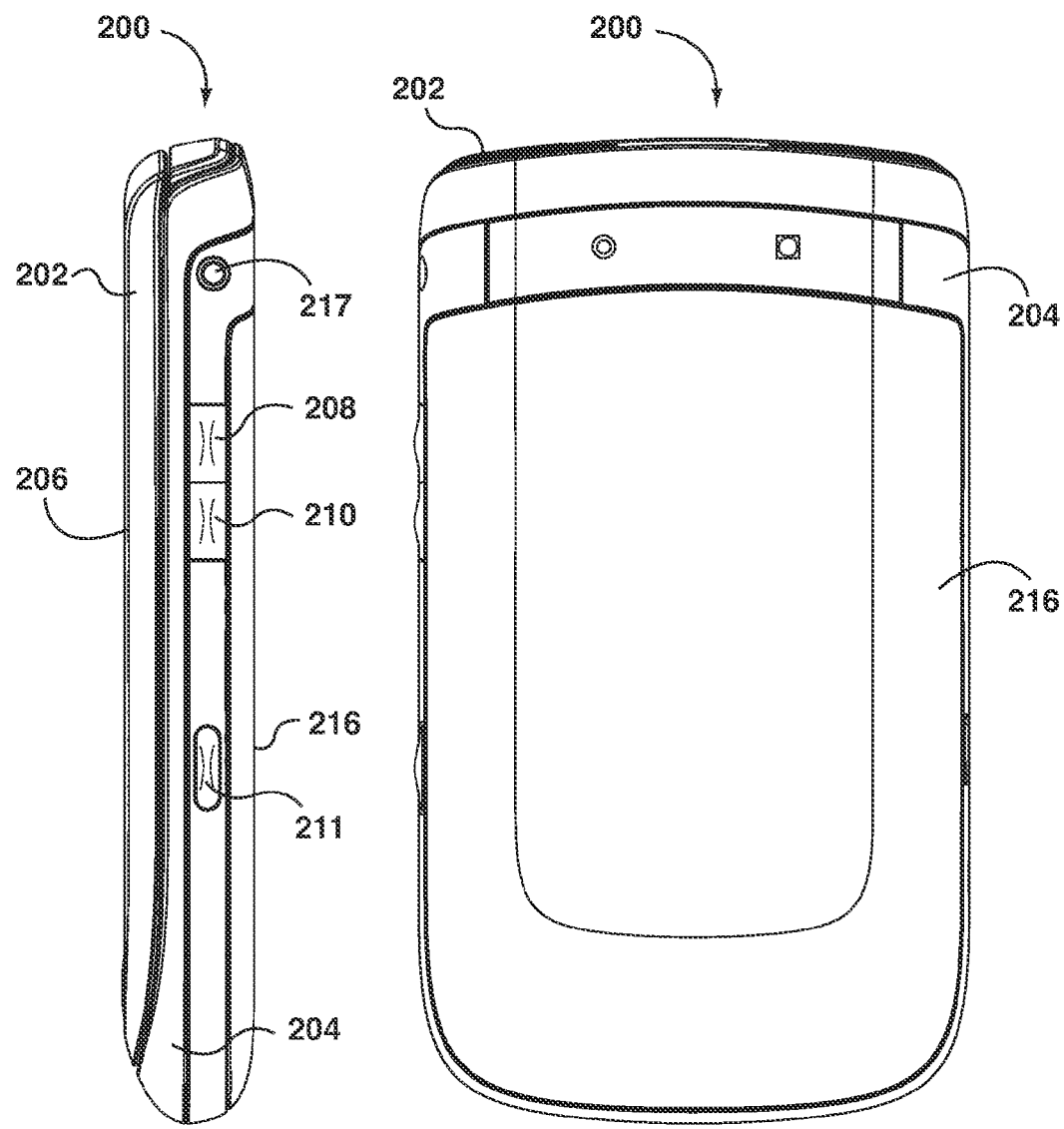

PORTABLE ELECTRONIC DEVICE WITH AUXILIARY INPUT DEVICE AND FLEX CONNECTOR THEREFOR

CROSS-REFERENCE TO RELATED APPLICATION

This application claims priority to U.S. Provisional Application No. 61/304,693 filed on Feb. 15, 2010 and entitled PORTABLE ELECTRONIC DEVICE WITH AUXILIARY INPUT DEVICE AND FLEX CONNECTOR THEREFOR, the entire contents of which are hereby incorporated herein by reference.

FIELD OF TECHNOLOGY

The present disclosure relates to portable electronic devices, and in particular to portable electronic devices having an upper housing slidable relative to a lower housing.

BACKGROUND

Electronic devices, including portable electronic devices, have gained widespread use and may provide a variety of functions including, for example, telephonic, electronic text messaging, and other personal information manager (PIM) application functions. Portable electronic devices can include several types of devices including mobile stations such as simple cellular phones, smart phones, Personal Digital Assistants (PDAs), tablets and laptop computers.

Devices such as PDAs or smart phones are generally intended for handheld use and ease of portability. Smaller devices are generally desirable for portability. Smaller portable electronic devices are available in various constructions, including unibody designs, "clamshell" or "flip-phone" styles and "slider" phones.

BRIEF DESCRIPTION OF THE DRAWINGS

Embodiments of the present disclosure will now be described, by way of example only, with reference to the attached Figures, wherein:

FIG. 2 is a first side view of a portable electronic device according to one embodiment shown in a closed position;

FIG. 3 is a front view of the portable electronic device of FIG. 2;

FIG. 4 is a second side view of the portable electronic device of FIG. 2;

FIG. 5 is a back view of the portable electronic device of FIG. 2;

DETAILED DESCRIPTION

Figure 1:
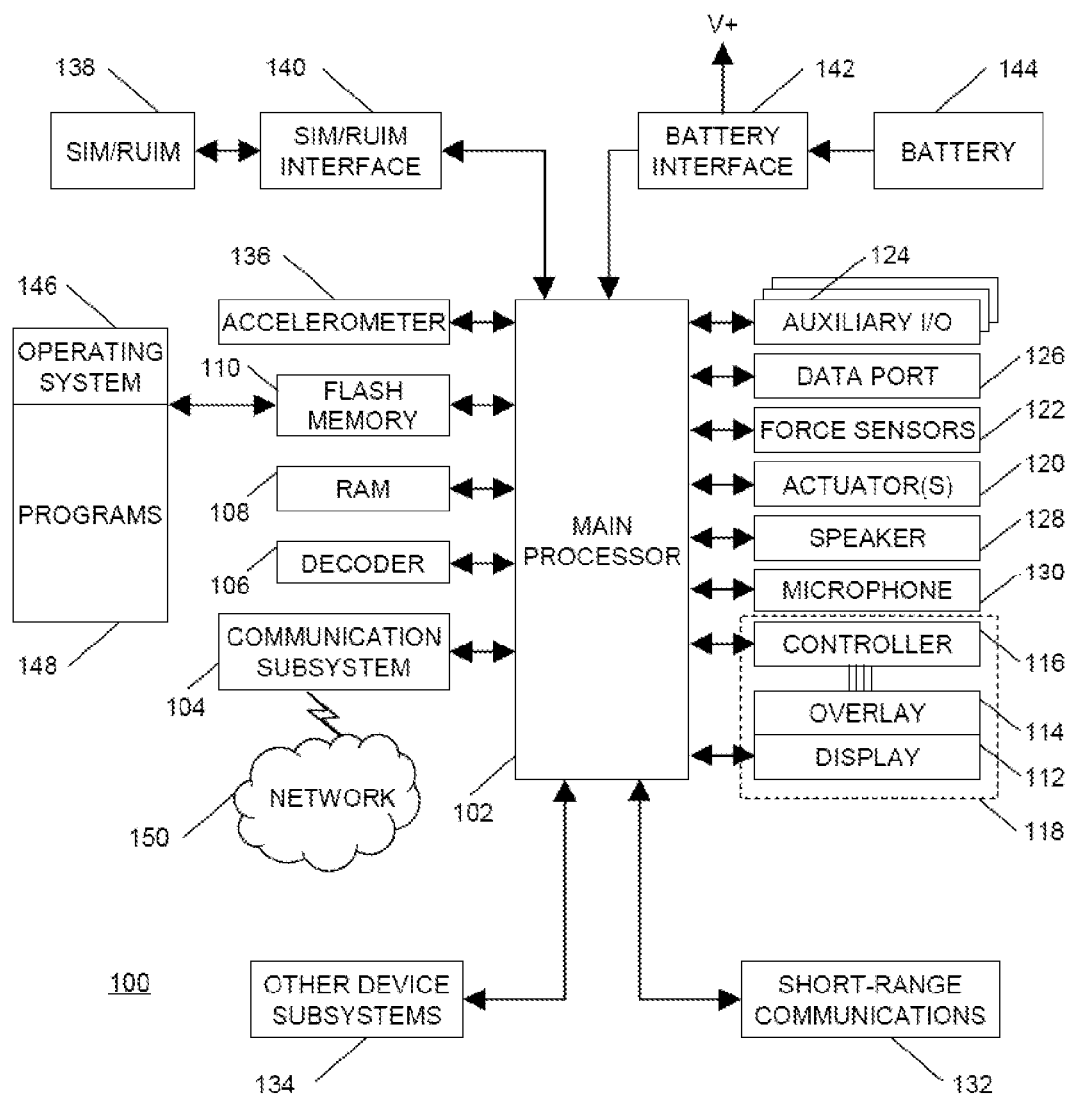
FIG. 1 is a simplified block diagram of components including internal components of a portable electronic device according to one embodiment.

The following describes a portable electronic device that includes a lower housing and an upper housing slidable relative to the lower housing between closed and open positions. A primary flex connector electrically connects the lower and upper housings. The upper housing includes an auxiliary input device and a secondary flex connector for the auxiliary input device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limited to the scope of the example embodiments described herein.

FIG. 1 shows a simplified block diagram of components including internal components of a portable electronic device 100 according to one embodiment. FIG. 1 is exemplary only, and those persons skilled in the art will appreciate the additional elements and modifications necessary to make the portable electronic device 100 work in particular network environments.

The portable electronic device 100 includes multiple components such as a processor 102 that controls the operations of the portable electronic device 100. Communication functions, including data communications, voice communications, or both can be performed through a communication subsystem 104. Data received by the portable electronic device 100 is decompressed and decrypted by a decoder 106. The communication subsystem 104 receives messages from and sends messages to a wireless network 150.

The wireless network 150 can be any type of wireless network, including, but not limited to, data-centric wireless networks, voice-centric wireless networks, and dual-mode networks that support both voice and data communications over the same physical base stations.

The portable electronic device 100 can be a battery-powered device and as shown includes a battery interface 142 for receiving one or more rechargeable batteries 144.

The processor 102 also interacts with additional subsystems such as a Random Access Memory (RAM) 108, a flash memory 110, a display 112 with a touch-sensitive overlay 114 connected to an electronic controller 116 that together comprise a touch-sensitive display 118, an actuator assembly 120, one or more optional force sensors 122, an auxiliary input/output (I/O) subsystem 124, a data port 126, a speaker 128, a microphone 130, short-range communications 132 and other device subsystems 134.

User-interaction with the graphical user interface can be performed through the touch-sensitive overlay 114. The processor 102 interacts with the touch-sensitive overlay 114 via the electronic controller 116. Information, such as text, characters, symbols, images, icons, and other items that can be displayed or rendered on a portable electronic device, is displayed on the touch-sensitive display 118 via the processor 102.

The processor 102 can also interact with an accelerometer 136 as shown in FIG. 1. The accelerometer 136 can include a cantilever beam with a proof mass and suitable deflection sensing circuitry. The accelerometer 136 can be utilized for detecting direction of gravitational forces or gravity-induced reaction forces.

To identify a subscriber for network access according to the present embodiment, the portable electronic device 100 can use a Subscriber Identity Module or a Removable User Identity Module (SIM/RUIM) card 138 inserted into a SIM/RUIM interface 140 for communication with a network such as the wireless network 150.

Alternatively, user identification information can be programmed into the flash memory 110.

The portable electronic device 100 also includes an operating system 146 and software components 148 that are executed by the processor 102 and which can be stored in a persistent store such as the flash memory 110. Additional applications can be loaded onto the portable electronic device 100 through the wireless network 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber can also compose data items, such as e-mail messages, for example, which can be transmitted over the wireless network 150 through the communication subsystem 104.

For voice communications, the overall operation of the portable electronic device 100 is similar. The speaker 128 outputs audible information converted from electrical signals, and the microphone 130 converts audible information into electrical signals for processing.

Figures 6, 7:
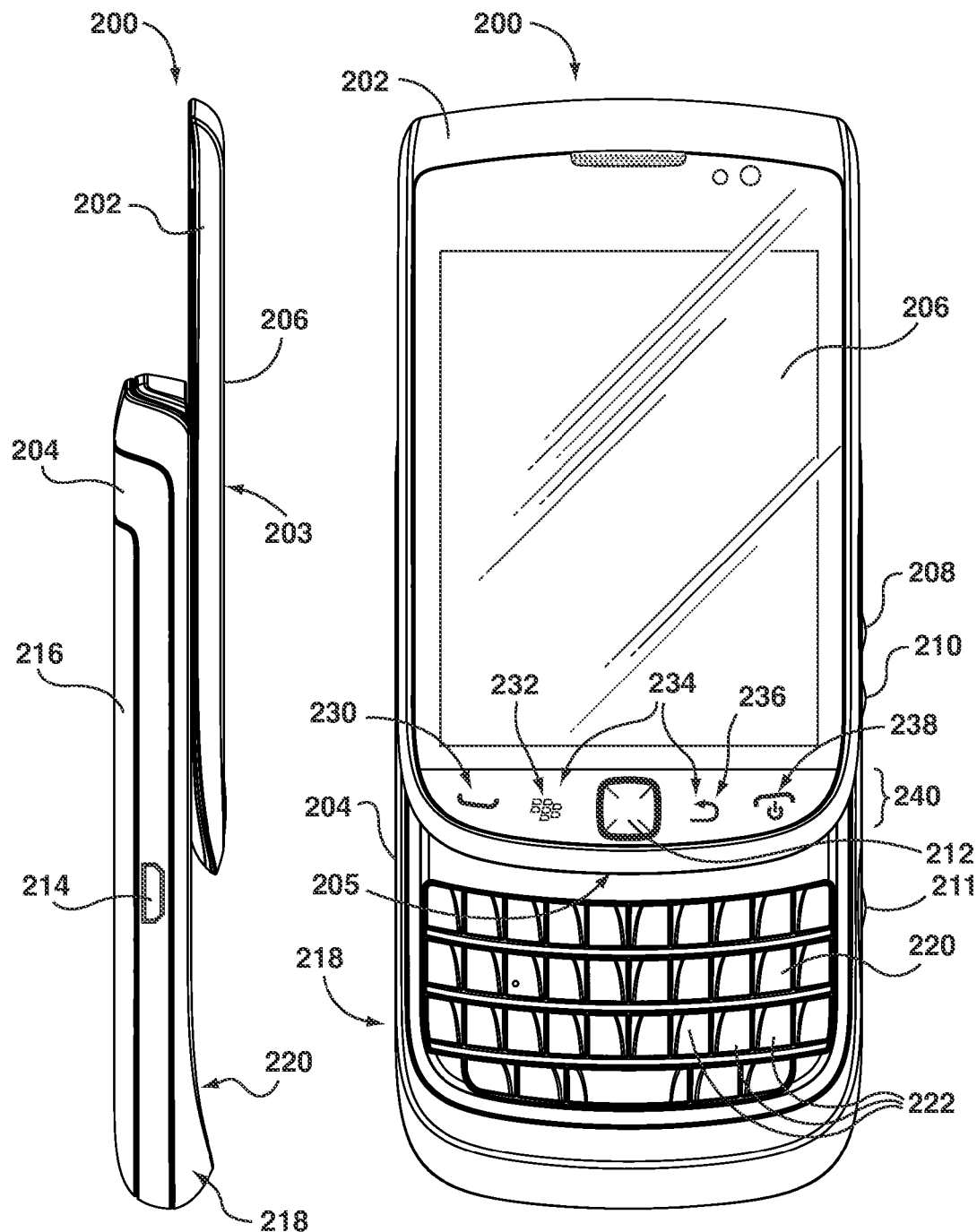
FIG. 6 is a first side view of the portable electronic device of FIG. 2 shown in an open position.
FIG. 7 is a front view of the portable electronic device of FIG. 6.
Figures 8, 9:
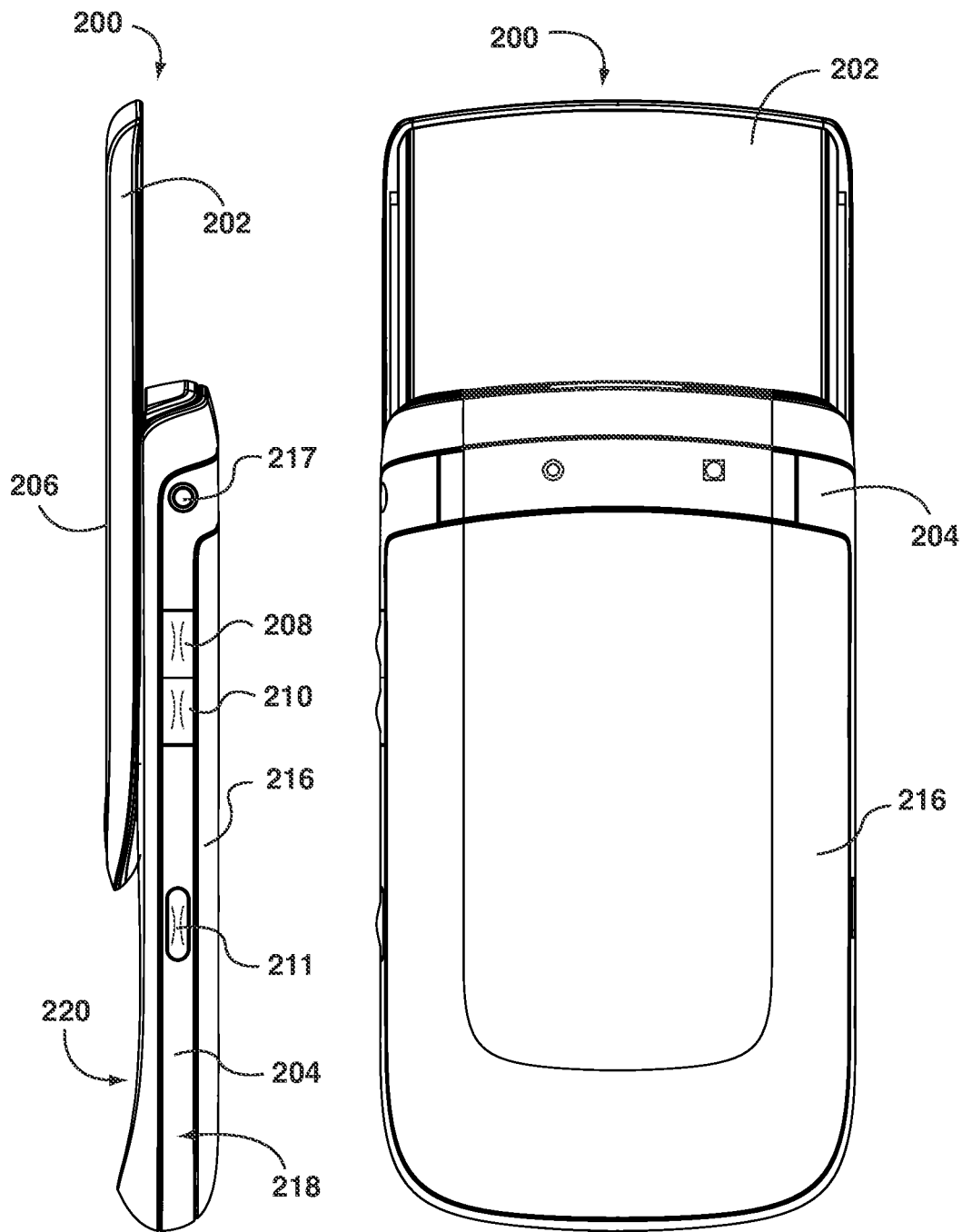
FIG. 8 is a second side view of the portable electronic device of FIG. 6.
FIG. 9 is a back view of the portable electronic device of FIG. 6.
Figure 10:
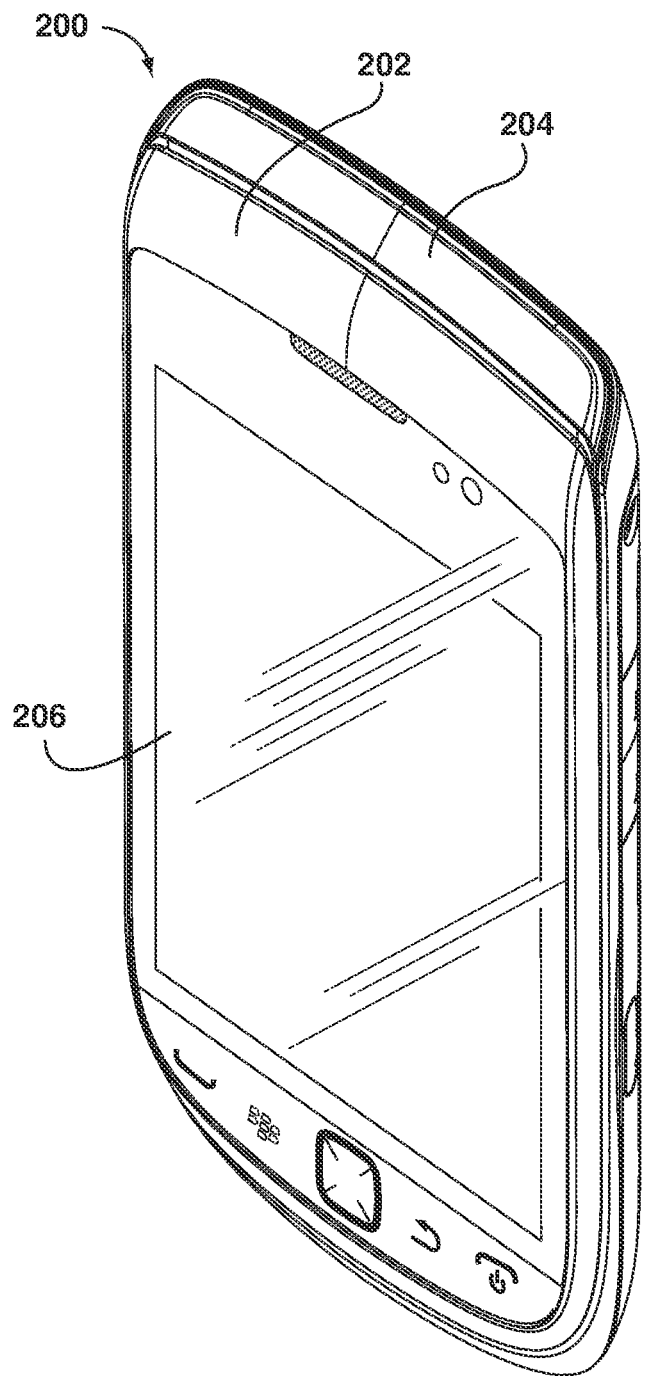
FIG. 10 is a perspective view of the portable electronic device of FIG. 2.
Figure 11:
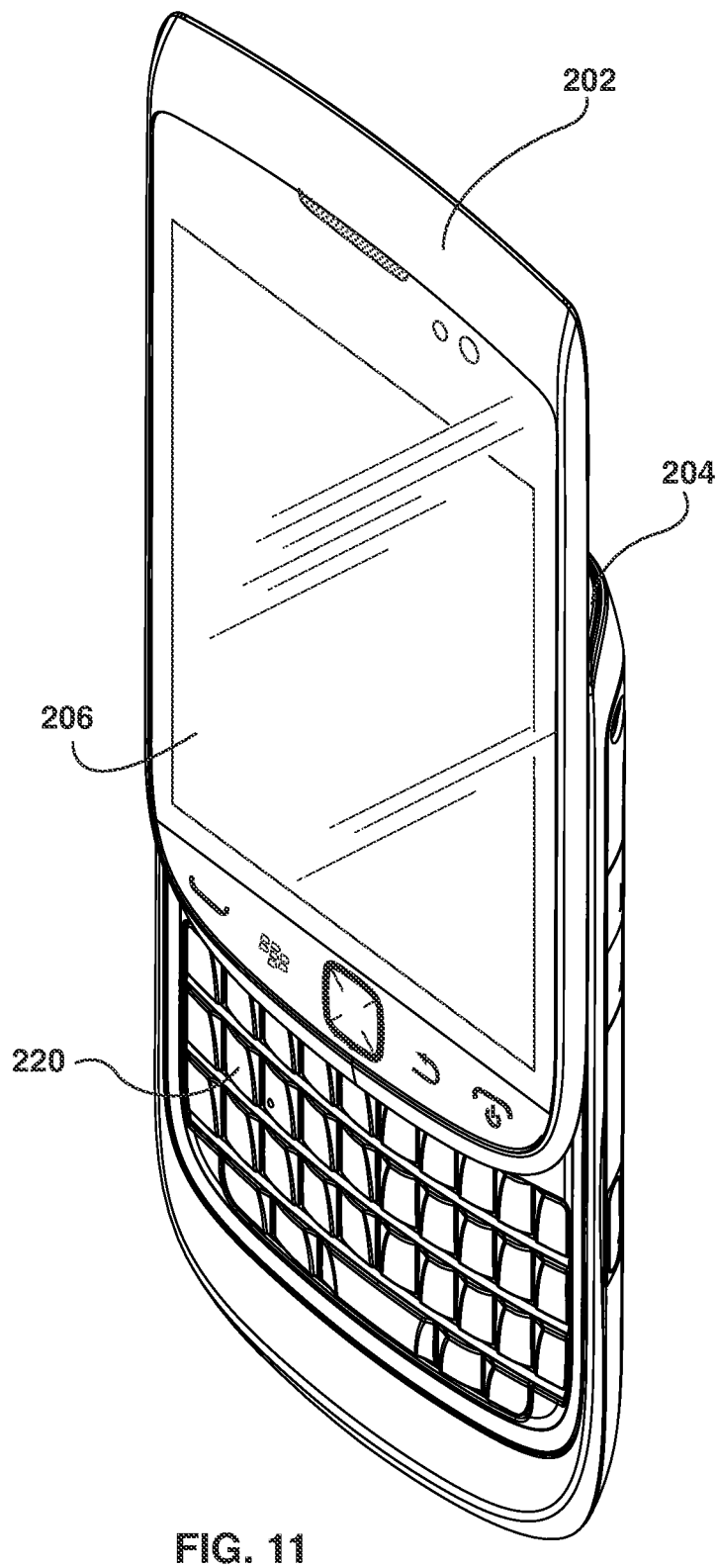
FIG. 11 is a perspective view of the portable electronic device of FIG. 6.

Turning now to FIGS. 2 to 11, illustrated generally therein is a portable electronic device 200 according to one example. The portable electronic device 200 is commonly referred to as a "slider" style device and includes an upper housing 202 (or sliding portion) and a rear, lower housing 204 (or base portion). The upper housing 202 and lower housing 204 are coupled together, and the upper housing 202 is slidable relative to the lower housing 204 in a first linear direction between a closed position (e.g., as shown in FIG. 2) and an open position (e.g., as shown in FIG. 6).

In some examples, and as shown, the portable electronic device 200 is generally taller than it is wide. In such examples, as the portable electronic device 200 moves between the closed and open positions, the upper housing 202 is moving relative to the lower housing 204 generally parallel to a longitudinal axis of the portable electronic device 200.

As shown, the upper housing 202 generally includes a display 206, which can be an LCD display and which can have touch screen capabilities. In some examples, the display 206 could be the same as or similar to the display 118 as generally described above.

Optionally, in some examples, the display 206 can be a touch-sensitive display. The touch-sensitive display can be a capacitive touch-sensitive display, for example, and a user's touch on the touch-sensitive display can be determined by determining an X and Y location of the touch, with the X location determined by a signal generated as a result of capacitive coupling with a touch sensor layer and the Y location determined by the signal generated as a result of capacitive coupling with another touch sensor layer. Each of the touch-sensor layers provides a signal to a controller that represents the respective X and Y touch location values. Thus, a feature such as a virtual button or other feature displayed on the touch-sensitive display can be selected by a mapping of the touch location to a feature on the touch-sensitive display.

As shown, each of the upper housing 202 and lower housing 204 can include one or more input apparatus, such as navigation keys or buttons, a physical or virtual keyboard, a trackpad, trackball, multimedia keys, etc.

The upper housing 202 as shown includes an auxiliary input device 212 that responds to user interaction, and which can be used for navigating around the display 206, to select objects on the display 206, or for other purposes. The auxiliary input device 212 can act as a cursor navigational tool and can be exteriorly located upon a front 203 of the upper housing 202. The front location of the auxiliary input device 212 is advantageous because it makes the tool easily thumb-actuatable when the device is in both the open and closed positions.

Implementation of the auxiliary input device 212 can provide for relatively fine navigation control, for example, as compared with the touch sense capabilities of the display 206. Thus, for example, when using the touch-sensitive display 206 to navigate a website, the user can quickly and easily switch thumb position to utilize the optically based user input device to scroll around the website and access relatively small links.

In some examples, the auxiliary input device 212 can consist of an optically based user input device, which can be referred to as a "trackpad". The optically based user input device can be utilized to instruct two-dimensional screen cursor movement in substantially any direction, as well as act as an actuator when the optically based user input device is depressed like a button. Examples of handheld electronic communication devices with optically based user input devices are taught, for example, in U.S. Publication No. 20090195499, the entirety of which is incorporated herein by reference.

In some other examples, the auxiliary input device 212 can be a mechanical device that responds to user interaction (e.g., a trackball).

The display 206 and the auxiliary input device 212 are generally disposed on the front 203 of the upper housing 202 and exposed for user accessibility when the portable electronic device 200 is in either of the open or closed positions.

The upper housing 202 can also include other input devices, such as a dedicated phone application button, a dedicated "disconnect call" button, a home screen button, etc. In various embodiments, these input devices include optical sensors, mechanical buttons, or both.

For example, as shown, the upper housing 202 can include a navigation row 240 including a plurality of navigation keys 234 adjacent to the auxiliary input device 212. The portable electronic device 200 can be configured to send and receive voice communications such as mobile telephone calls. To facilitate telephone calls, two call keys 230, 238 ("outer keys") are provided in the navigation row 240 at the outer ends of the navigation row 240. One of the two call keys is a call initiation key 230 and the other is a call termination key 238. The navigation row 240 also includes another pair of keys 232, 236 ("flanking keys") that are located immediately adjacent to the auxiliary input device 212. One is a menu call-up key 232 and the other is an escape or back key 236. The menu call-up key 232 can be used to bring up a menu on the display 206 and the escape key 236 can be used to return to the previous screen or previous menu selection. The functions of the call keys and the menu keys may, of course, be provided by buttons that are located elsewhere on the device, with different functions assigned to the outer keys and the flanking keys.

Turning now to the lower housing 204, the lower housing 204 can include various buttons and other controls, such as buttons 208 and 210, and which could be used for navigation, to control volume or for other purposes.

The lower housing 204 could also include one or more application buttons 211 that can be used to automatically launch a particular application on the portable electronic device 200 (e.g., a camera application, a phone application, etc.). In some embodiments, the button 211 can be configurable by a user (e.g., the user can be able to select the particular application launched by the button 211).

As shown in FIGS. 2 and 6, the lower housing 204 could also include one or more input or output ports (e.g., I/O ports), such as a microUSB port 214 (and which could be similar to or the same as data port 126). In some examples, the port 214 can be used for data communication with the portable electronic device 200, for charging of a battery (not shown, but which could for example be battery 144) on the device 200 or for both.

As shown, the lower housing 204 can also include a battery cover 216 for covering the battery (not shown). In some embodiments, the battery cover 216 can be removable. In other embodiments, the battery cover 216 can be permanently fixed to the device.

In some embodiments, the lower housing 204 can also include an audio jack 217. The audio jack 217 can be used to couple the portable electronic device 200 to a speaker, a microphone, or both, for example for use in voice communication.

Turning now to FIGS. 6 to 9 and 11, as shown when the portable electronic device 200 is in the open position, a keypad 220 is exposed on a lower portion 218 of the lower housing 204. The keypad 220 generally includes a plurality of alphanumeric keys 222, which can be positioned in a plurality of rows and columns. In some embodiments, the keys 222 can represent the alphabet and can be arranged with a standard keyboard layout (e.g., QWERTY, QWERTZ, DVORAK, etc.).

As shown in FIGS. 2 to 5 and 10, when the portable electronic device 200 is in the closed position, the keypad 220 is covered by the upper housing 202. This can be beneficial as it can protect the keypad 220 when not in use, and can also inhibit keys from being pressed inadvertently when the user is carrying the portable electronic device 200 (e.g., in a pocket). However, in some cases (e.g., when the display 206 is a touch-sensitive display) the user can perform functions on the portable electronic device 200 while closed by interacting with the display 206, and/or by interacting with the buttons 208, 210, 211, the keys 230, 232, 236, 238, and the auxiliary input device 212. As mentioned above, the display 206 and the auxiliary input device 212 are generally disposed on the front 203 of the upper housing 202 and exposed for user accessibility when the portable electronic device 200 is in either of the open or closed positions.

When the portable electronic device 200 is in the open position (as shown in FIGS. 6 to 9 and 11), the keypad 220 is exposed for user accessibility. Furthermore, auxiliary input device 212 is disposed near a bottom side 205 of the upper housing 202 so that, when in the open position (as shown in FIGS. 6 to 9 and 11), the auxiliary input device 212 is arranged between the display 206 and the keypad 220. The arrangement of the auxiliary input device 212 between the display 206 and the keypad 220 can reduce interference during keyboarding, does not block the user's view of the display 206 during use, and provides for relatively short distances for a user's thumb to travel back and forth between the display 206 (if touch-sensitive), the auxiliary input device 212 and the keypad 220 during use.

Figure 12:
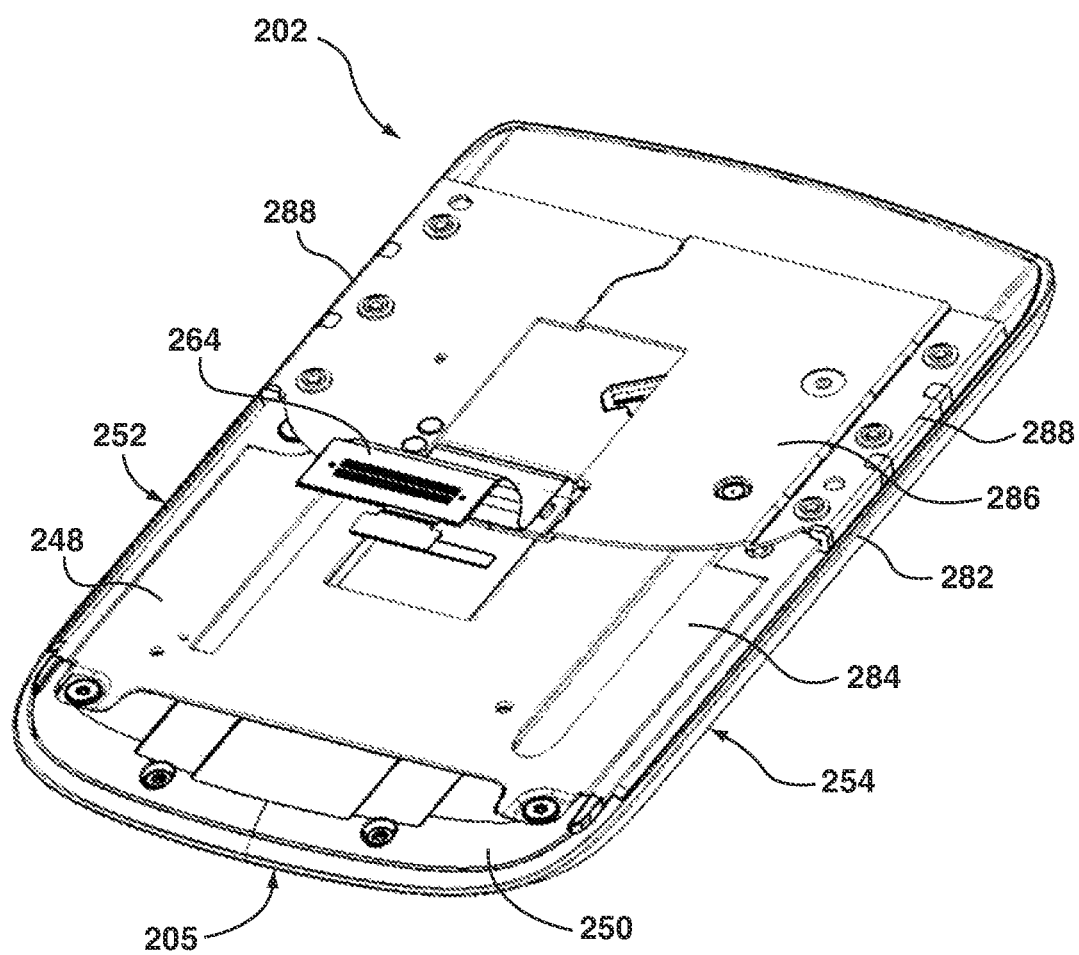
FIG. 12 is a back perspective view of an upper housing of the portable electronic device.

Reference is now made to FIG. 12, which illustrates an inner or rear side 248 of the upper housing 202. A cover plate 250 is affixed to the rear side 248 along the bottom side 205, extending generally between lateral sides 252, 254. Also shown is a portion 264 of a primary flex connector (described below), which provides electrical connectivity between the upper housing 202 and the lower housing 204.

Figure 13:
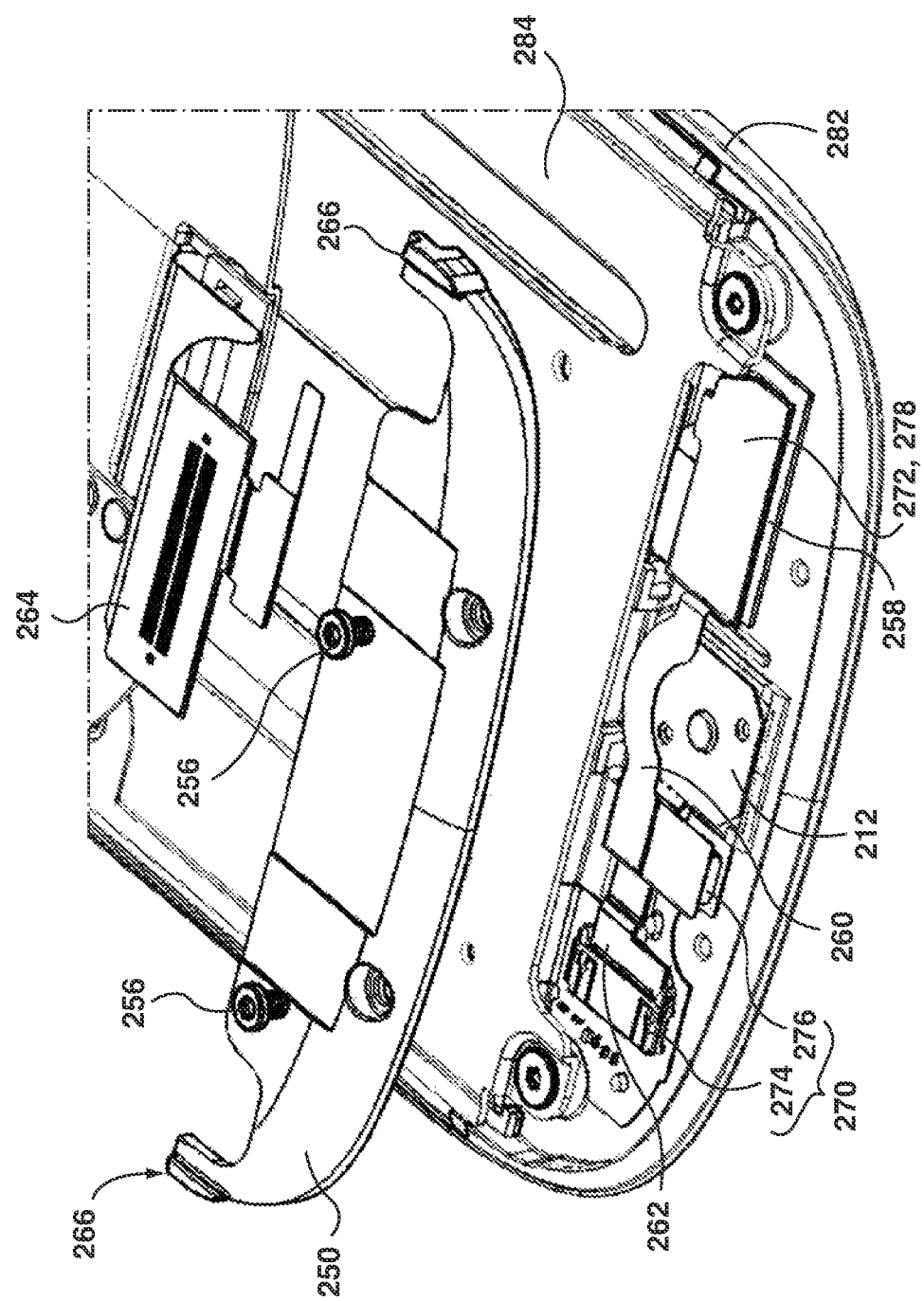
FIG. 13 is a back perspective view of a portion of the upper housing of FIG. 12 with a cover plate separated therefrom.

Referring to FIG. 13, fasteners 256 can be used to affix the cover plate 250 to the upper housing 202. Of course other means of affixing the cover plate 250 are possible. For example, the cover plate 250 can be provided with tabs (not shown) and corresponding receiving slots (not shown) can be provided in the upper housing 202, the tabs and slots enabling a "snap-fit" arrangement.

The cover plate 250 can be configured to conceal and protect one or more electrical connections housed in the upper housing 202. As shown, a first secondary flex connector 258 associated with the display 206, a second secondary flex connector 262 associated with the auxiliary input device 212 and a third secondary flex connector 260 associated with the navigation keys 230, 232, 236, 238 can be arranged directly underneath the cover plate 250.

Figure 14:
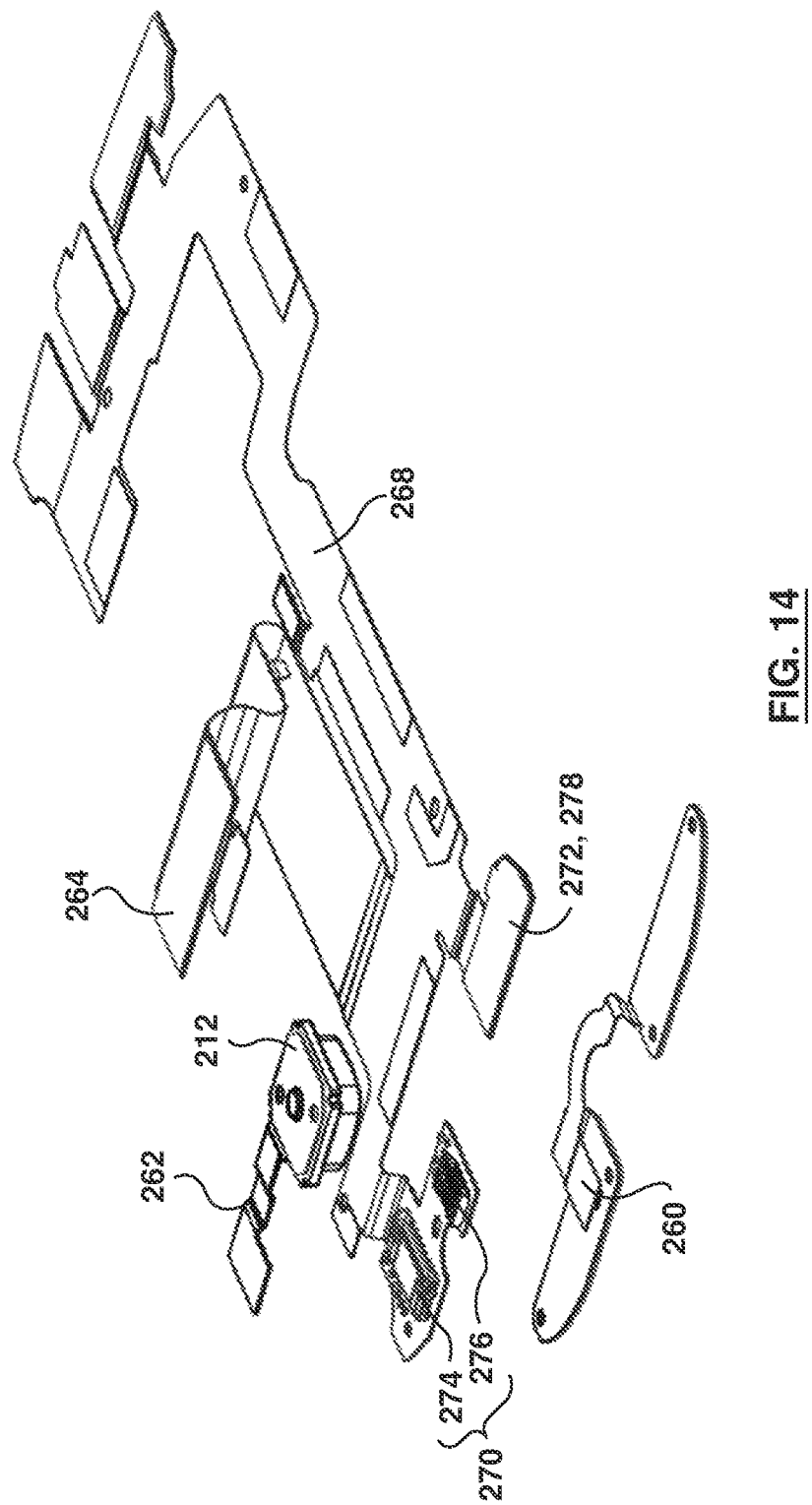
FIG. 14 is a back perspective exploded view of various components of the upper housing.

A primary flex connector 268 is shown in FIG. 14. The primary flex connector 268 provides electrical connectivity between the upper housing 202 and the lower housing 204, and can be referred to as a "dynamic" flex connector. Each of the secondary flex connectors 258, 260, 262 are operably connected to the primary flex connector 268 providing electrical connectivity between the upper housing 202 and the lower housing 204.

Referring to FIGS. 12, 13 and 14, the primary flex connector 268 includes the portion 264 that is arranged externally of the upper housing 202 for connection to the lower housing 204. The primary flex connector 268 also includes first and second flanking portions 270, 272. The first flanking portion 270 is arranged between the auxiliary input device 212 and the lateral side 252. The second flanking portion 272 is arranged between the auxiliary input device 212 and the lateral side 254. The first flanking portion 270 includes a connecting segment 274 for connection to the flex connector 262, and a connecting segment 276 for connection to the flex connector 260. The second flanking portion 272 includes a connecting segment 278 for connection to the flex connector 258.

The flanking portions 270, 272 enable a relatively thin design for the upper housing 202 in which the electrical connectors are distributed between the lateral sides 252, 254, and near the bottom side 205. In other words, the connecting segments 274, 276, 278 are located spaced around to avoid the display 206 and the auxiliary input device 212, thus minimizing thickness of the upper housing 202. A thicker design for the upper housing 202 would be necessary if, for example, the connecting segments 274, 276, 278 were located directly underneath the display 206.

Figure 16:
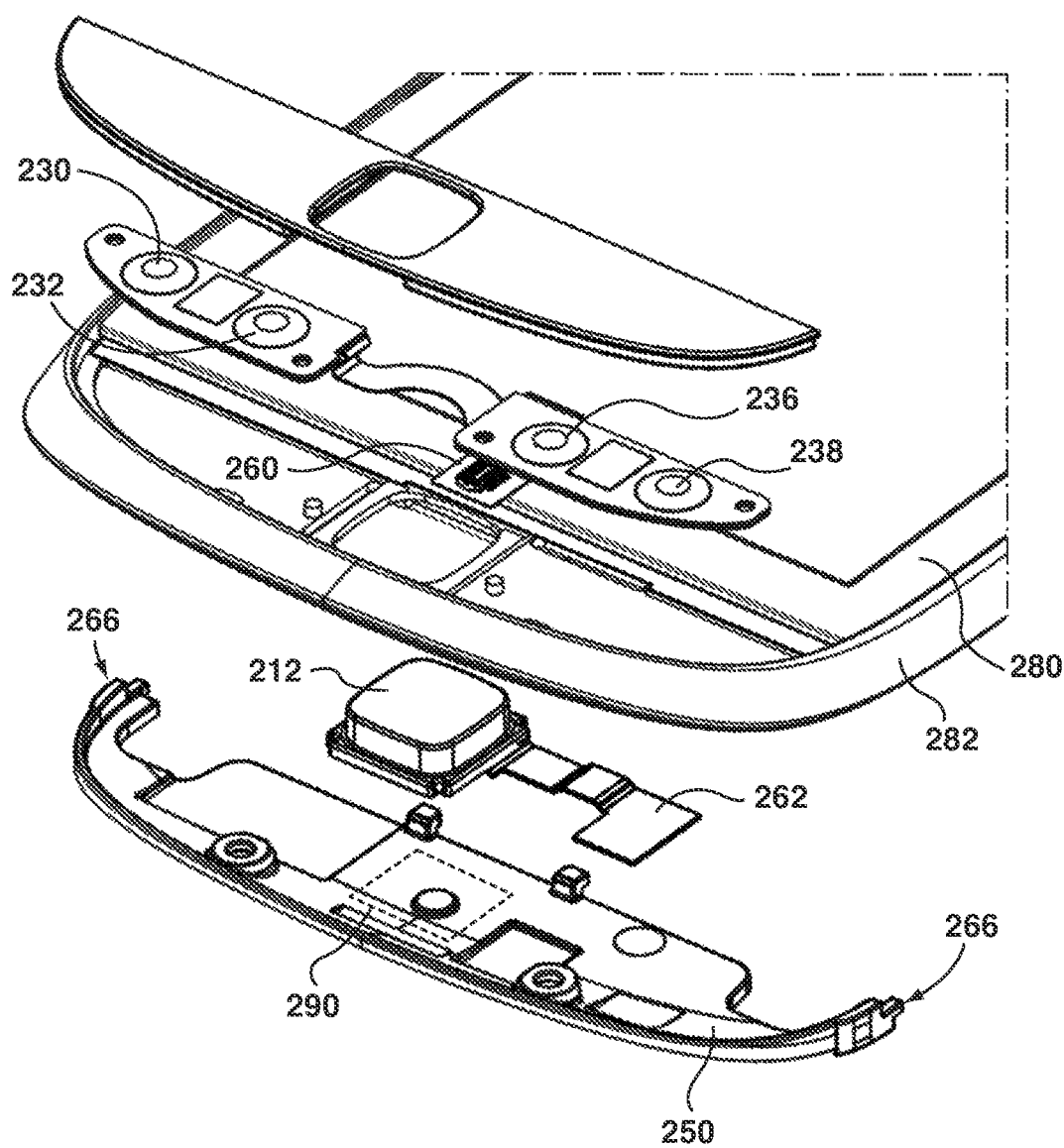
FIG. 16 is a front perspective exploded view of a portion of the upper housing.

Furthermore, as shown in FIGS. 13 and 14, the flex connector 260 includes a bridging portion that leads from the navigation keys on one side of the portable electronic device 200 (i.e. 230 and 232 as shown in FIG. 16) to the connecting segment 276 on the other side of the portable electronic device 200. The bridging portion is spaced apart from the bottom side 205 to physically circumvent the auxiliary input device 212. In other words, the auxiliary input device 212 is arranged intermediate of the bridging portion of the flex connector 260 and the bottom side 205.

It is advantageous that the secondary flex connectors 258, 260, 262 and the flanking portions 270, 272 of the primary flex connector 268 are all arranged towards the bottom side 205. In some examples, the cover plate 250 can be removable after assembly of the portable electronic device 200 to provide access to the secondary flex connectors 258, 260, 262 and the flanking portions 270, 272 of the primary flex connector 268, and/or other components, either for repairs or troubleshooting.

Figure 15:
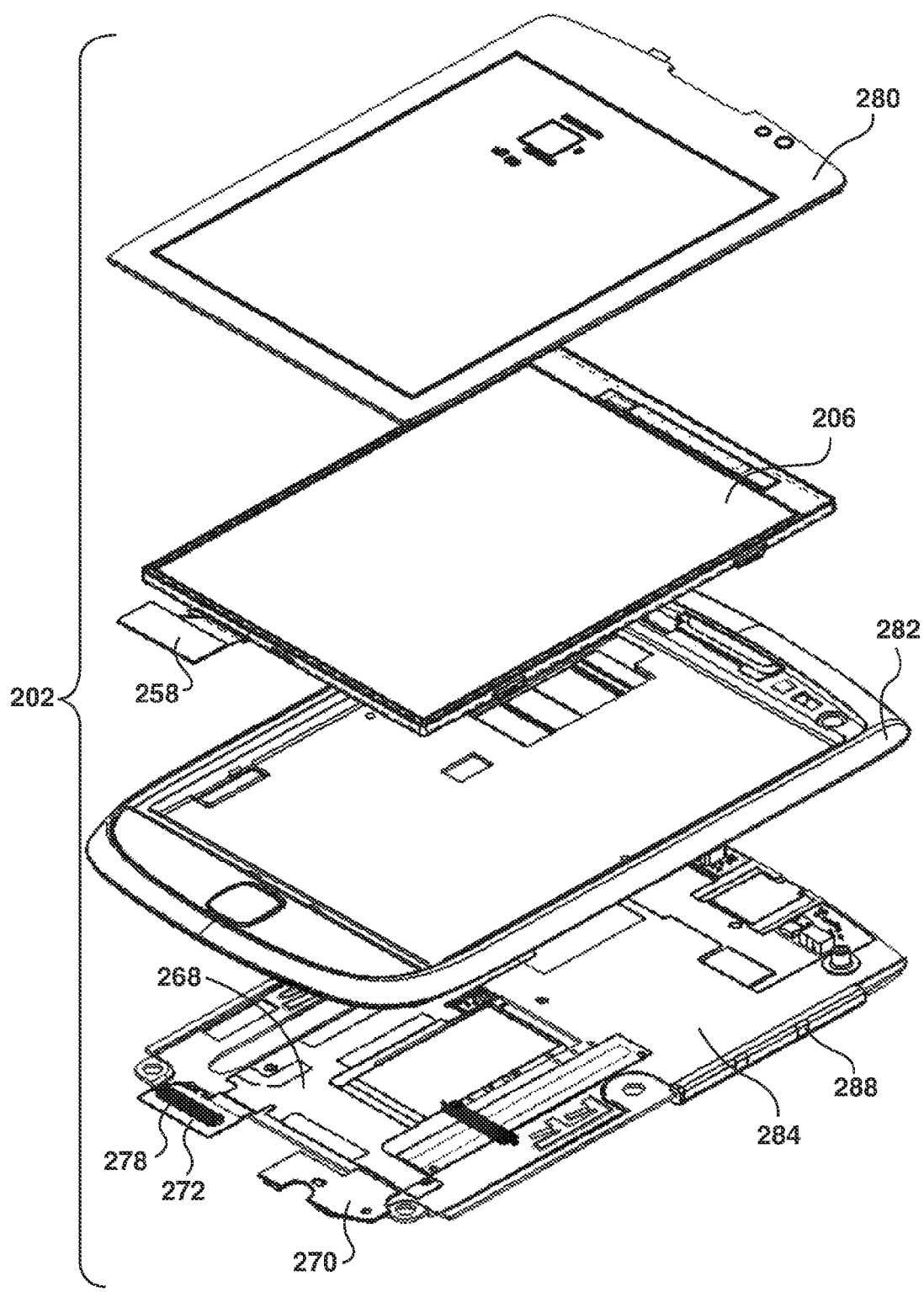
FIG. 15 is a front perspective exploded view of various components of the upper housing.

Referring to FIG. 15, and with reference back to FIG. 12, in some examples the upper housing 202 includes a lens 280, a display 206, a slide housing 282, a slide plate 284, and a guide base 286. The guide base 286 includes c-channel structures 288 that allow the guide base 286 to slide relative to the slide plate 284. The guide base 286 is affixed to the lower housing 204 (not shown) enabling the upper housing 202 to slide relative thereto. As shown, the primary flex connector 268 can be installed onto the slide plate 284.

It can be seen in FIGS. 14 and 15 that the connecting segments 274, 276 are facing an opposing direction as compared with the connecting segment 278. The connecting segment 278 faces forward because the display 206 is assembled in front of the slide plate 284, and thus the secondary flex connector 258 is arranged in front of the connecting segment 278. On the other hand, the connecting segments 274, 276 face backward to allow the secondary flex connectors 260, 262 to be connected to the connecting segments 274, 276 in back of the slide plate 284 after the lens 280, the display 206, the slide housing 282 and the slide plate 284 have been assembled into one unit.

As shown best in FIG. 16, an interior region 290 of the cover plate 250 can provide a backing structure to support the auxiliary input device 212 for examples where the auxiliary input device 212 includes actuator functionality and can be depressed like a button.

Figure 17:
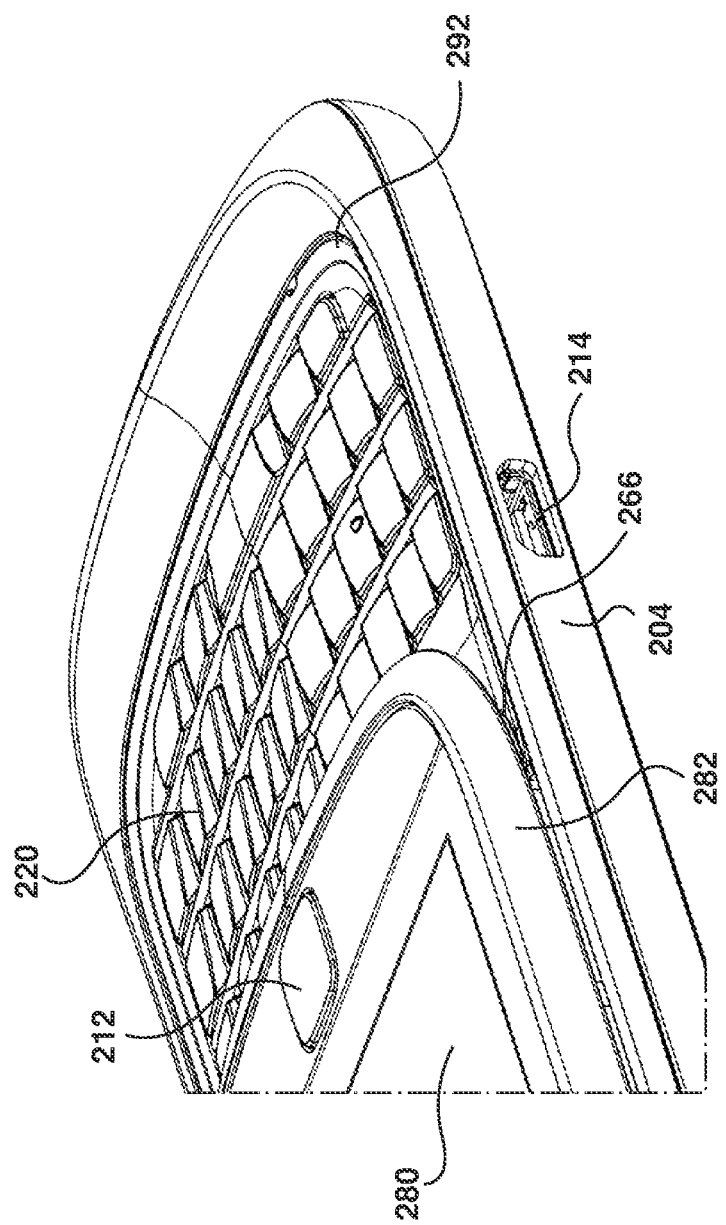
FIG. 17 is a front, side partial perspective view of the portable electronic device in the open position.
Figure 18:
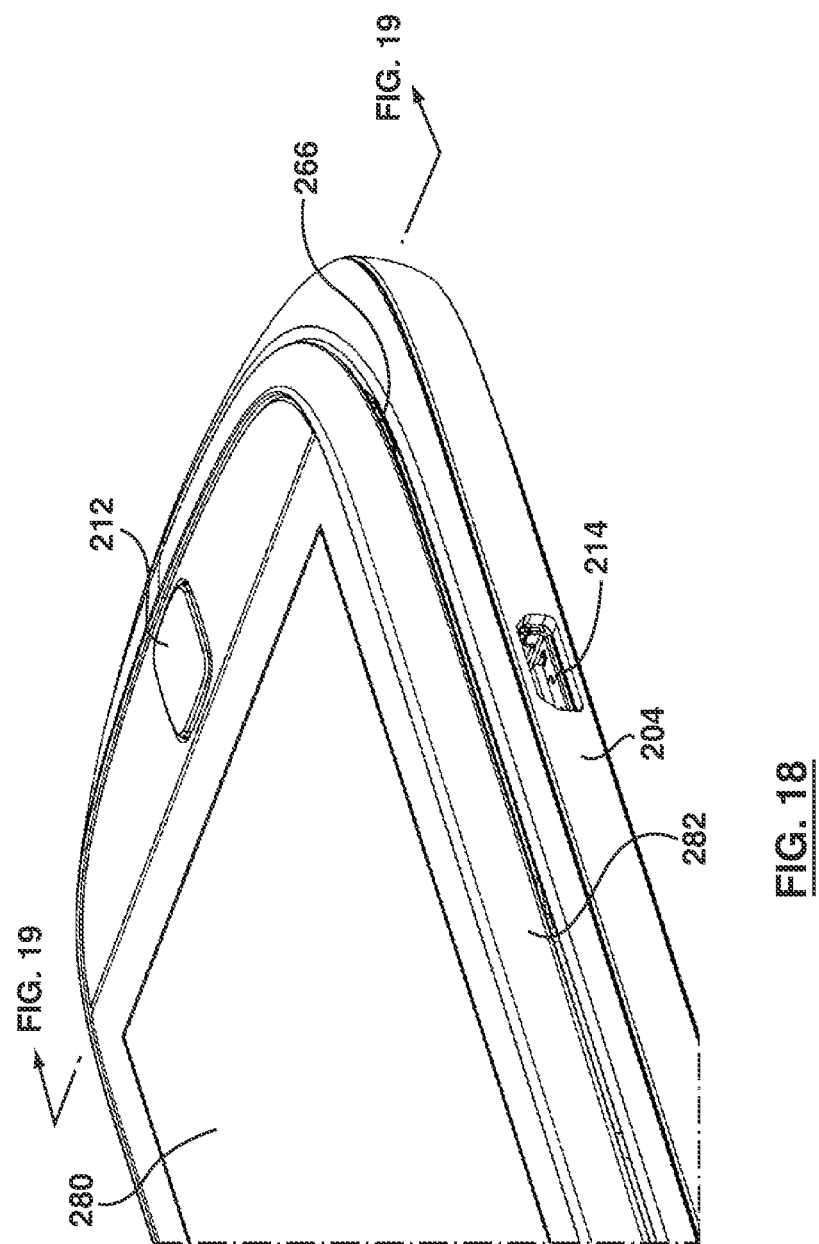
FIG. 18 is a front, side partial perspective view of the portable electronic device in the closed position.
Figure 19:
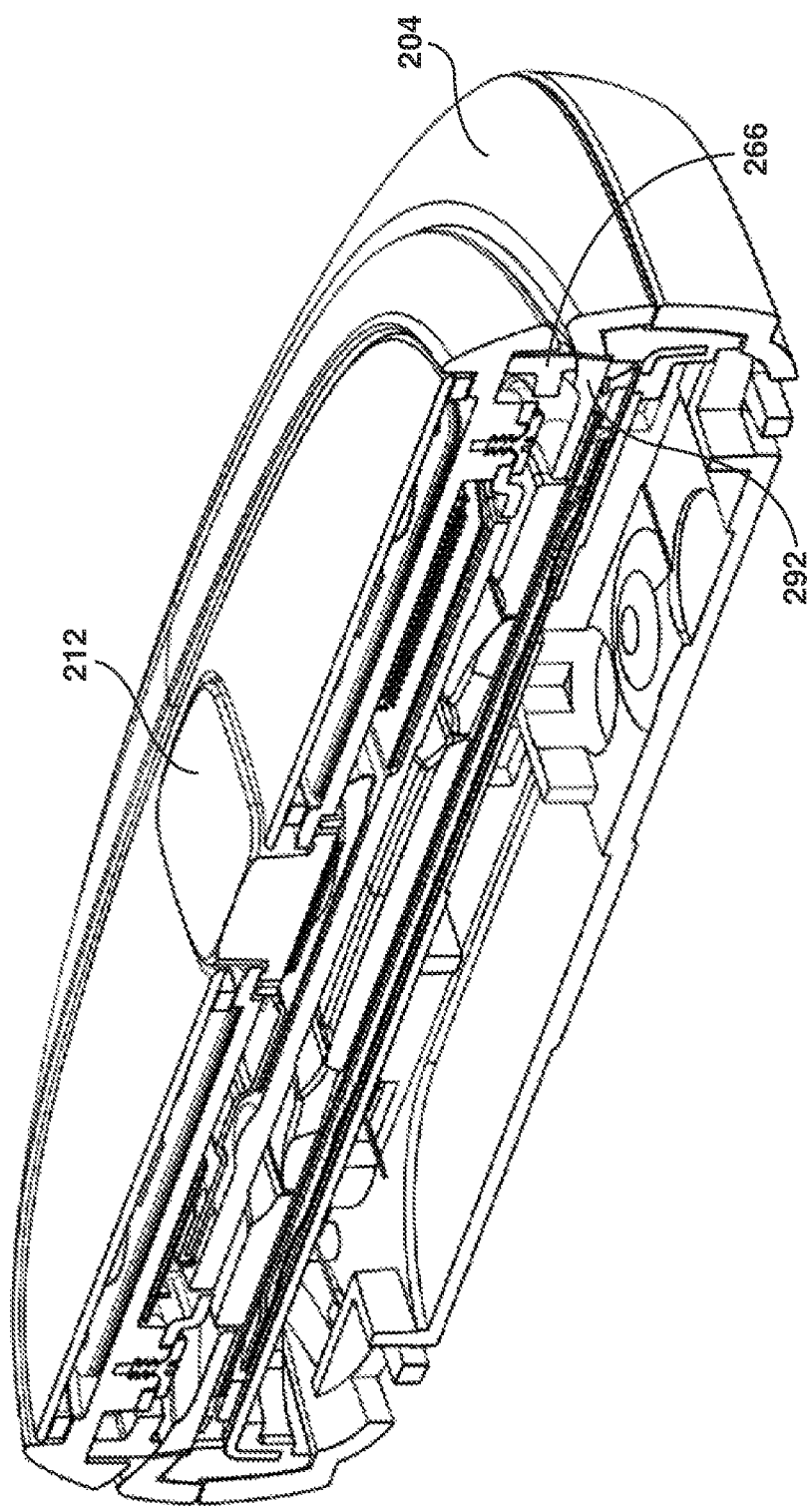
FIG. 19 is a sectional, perspective view of the portable electronic device of FIG. 18.

As shown in FIG. 13, the cover plate 250 can include spacing elements 266 disposed on opposing lateral sides of the cover plate 250. The spacing elements 266 engage the lower housing 204 and serve as gap control features for maintaining a generally uniform gap between the upper housing 202 and the lower housing 204 as the upper housing 202 slides between the closed and opened positions, as shown in FIGS. 17, 18 and 19. The gap provided by the spacing elements 266 effectively accommodates the keypad 220, which can have a height dimension, preventing the upper portion 202 from rubbing against the keypad 220 as the upper housing 202 slides between the closed and opened positions. The spacing elements 266 can be configured to follow a sacrificial wearing surface 292 that is provided on the lower housing 204, disposed about a periphery of the keypad 220. The wearing surface 292 can be generally complementary in shape to the spacing elements 266.

While the above description provides examples of one or more processes or apparatuses, it will be appreciated that other processes or apparatuses may be within the scope of the accompanying claims.

We claim:
1. A portable electronic device, comprising:
   a lower housing;
   an upper housing coupled to the lower housing and slidable relative thereto between a closed position and an open position, the upper housing including a display disposed on a front of the upper housing generally between first and second lateral sides of the upper housing, the upper housing including an auxiliary input device disposed on the front;
   a primary flex connector configured to electrically connect the lower and upper housings, the primary flex connector comprising:
   i) a main portion aligned with a longitudinal axis of the portable electronic device, the main portion electrically connecting the upper housing to the lower housing;
   ii) a first flanking portion extending transverse to the main portion and having at least one electrical connector laterally offset from the main portion between the auxiliary input device and the first lateral side; and
   iii) a second flanking portion extending transverse to the main portion opposite the first flanking portion and having at least one electrical connector laterally offset from the main portion between the auxiliary input device and the second lateral side; and
   at least one secondary flex connector located within the upper housing and extending transverse to the longitudinal axis, each secondary flex connector electrically connected to one of the laterally offset electrical connectors and one of the display and the auxiliary input device.

2. The device of claim 1, wherein the first flanking portion of the primary flex connector is electrically connected to a first secondary flex connector associated with one of the display and the auxiliary input device.

3. The device of claim 2, wherein the second flanking portion of the primary flex connector is electrically connected to a second secondary flex connector associated with the other of the display and the auxiliary input device.

4. The device of claim 1, wherein the upper housing comprises a plurality of navigation keys disposed on the front generally between the display and a bottom side of the upper housing.

5. The device of claim 4, wherein the first flanking portion of the primary flex connector is electrically connected to a third secondary flex connector associated with the navigation keys.

6. The device of claim 5, wherein the navigation keys comprise first keys arranged generally between the auxiliary input device and the first lateral side, and second keys arranged generally between the auxiliary input device and the second lateral side.

7. The device of claim 6, wherein the third secondary flex connector comprises a bridging portion configured to electrically connect the first flanking portion of the primary flex connector to the second keys of the navigation keys.

8. The device of claim 7, wherein the auxiliary input device is arranged generally intermediate of the bridging portion and the bottom side of the upper housing.

9. The device of claim 1, wherein the upper housing comprises a cover plate affixed to a rear of the upper housing along a bottom side of the upper housing generally between the first and second lateral sides.

10. The device of claim 9, wherein the cover plate is removable to allow access to at least a portion of the primary flex connector.

11. The device of claim 9, further comprising at least one secondary flex connector, wherein the cover plate is removable to allow access to at least a portion of the secondary flex connector.

12. The device of claim 11, wherein the secondary flex connector is arranged directly underneath the cover plate.

13. The device of claim 1, wherein the auxiliary input device is adapted to provide for relatively fine navigational control of one or more objects on the display.

14. The device of claim 1, wherein the auxiliary input device is adapted to provide two-dimensional screen cursor movement on the display.

15. The device of claim 14, wherein the auxiliary input device is adapted to serve as an actuator by being depressible.

16. A portable electronic device, comprising:
a lower housing;
an upper housing coupled to the lower housing and slidable relative thereto between closed and open positions, the upper housing including a display disposed on a front of the upper housing generally between first and second lateral sides, the upper housing including an auxiliary input device disposed on the front generally between the display and a bottom side of the upper housing;
a primary flex connector configured to electrically connect the lower and upper housings, the primary flex connector including a first flanking portion extending transverse to a longitudinal axis of the portable electronic device and having at least one electrical connector laterally offset from a main portion of the primary flex connector between the auxiliary input device and the first lateral side, and a second flanking portion extending transverse to the longitudinal axis opposite the first flanking portion and having at least one electrical connector laterally offset from the main portion between the auxiliary input device and the second lateral side;
a first secondary flex connector in the upper housing electrically connecting the at least one laterally offset electrical connector of the first flanking portion with one of the auxiliary input device and the display; and
a second secondary flex connector in the upper housing electrically connecting the at least one laterally offset electrical connector of the second flanking portion with the other of the auxiliary input device and the display.

17. A portable electronic device, comprising:
a lower housing;
an upper housing coupled to the lower housing and slidable relative thereto along a longitudinal axis between closed and open positions, the upper housing including a display disposed on a front of the upper housing generally between first and second lateral sides, the upper housing including an auxiliary input device disposed on the front generally between the display and a bottom side of the upper housing, the upper housing including a cover plate affixed to a rear of the upper housing along a bottom side of the upper housing generally between the first and second lateral sides;
a primary flex connector configured to electrically connect the lower and upper housings, the primary flex connector comprising:
i) a main portion external of the upper housing and aligned with the longitudinal axis of the portable electronic device, the main portion electrically connecting the upper housing to the lower housing;
ii) a first flanking portion extending transverse to the main portion and having at least one electrical connector laterally offset from the main portion between the auxiliary input device and the first lateral side; and
iii) a second flanking portion extending transverse to the main portion opposite the first flanking portion and having at least one electrical connector laterally offset from the main portion between the auxiliary input device and the second lateral side; and
at least one secondary flex connector configured to electrically connect the at least one laterally offset electrical connector of the primary flex connector to at least one of the auxiliary input device and the display,
wherein the cover plate is removable to allow access to at least a portion of the primary and secondary flex connectors.

* * * * *